United States Patent [19]

Kawahara

[11] Patent Number: 5,168,365
[45] Date of Patent: Dec. 1, 1992

[54] INTERCHANGEABLE LENS SYSTEM WITH ABSOLUTE VALVE EXPOSURE CONTROL

[75] Inventor: Hideo Kawahara, Saitama, Japan

[73] Assignee: Canon Kabushiki Kaisha, Tokyo, Japan

[21] Appl. No.: 661,520

[22] Filed: Feb. 26, 1991

[30] Foreign Application Priority Data

Mar. 2, 1990 [JP]  Japan ................................ 2-51168

[51] Int. Cl.⁵ ...................... H04N 5/238; H04N 5/225
[52] U.S. Cl. ................................... 358/228; 358/909; 354/286
[58] Field of Search ...................... 358/228, 225, 909; 354/286

[56] References Cited

U.S. PATENT DOCUMENTS

| | | | |
|---|---|---|---|
| 4,833,498 | 5/1989 | Kato et al. | 358/225 |
| 4,855,814 | 8/1989 | Shiraishi et al. | 358/225 |
| 4,860,113 | 8/1989 | Miyamoto et al. | 358/225 |
| 4,959,728 | 9/1990 | Takahashi et al. | 358/228 |
| 4,967,281 | 10/1990 | Takada | 358/225 |

Primary Examiner—Michael Razavi
Assistant Examiner—Wendy R. Greening
Attorney, Agent, or Firm—Robin, Blecker, Daley & Driscoll

[57] ABSTRACT

An interchangeable lens system includes a camera unit and a lens unit detachably attached to the camera unit. The camera unit includes an exposure control signal forming circuit for forming an exposure control signal for control of the state of exposure and a control reference value for the exposure control signal, and a transmitting circuit for transmitting to the lens unit the exposure control signal formed by the exposure control signal forming circuit. The lens unit includes an exposure controlling circuit for controlling the state of exposure, a receiving circuit for receiving the exposure control signal from the camera unit, an information generating circuit for generating an absolute circuit amount for the exposure controlling circuit on the basis of the exposure control signal received by the receiving circuit, and a controlling circuit for controlling the exposure controlling circuit in accordance with the absolute control amount.

15 Claims, 6 Drawing Sheets

CAMERA-UNIT SIDE

LENS-UNIT SIDE

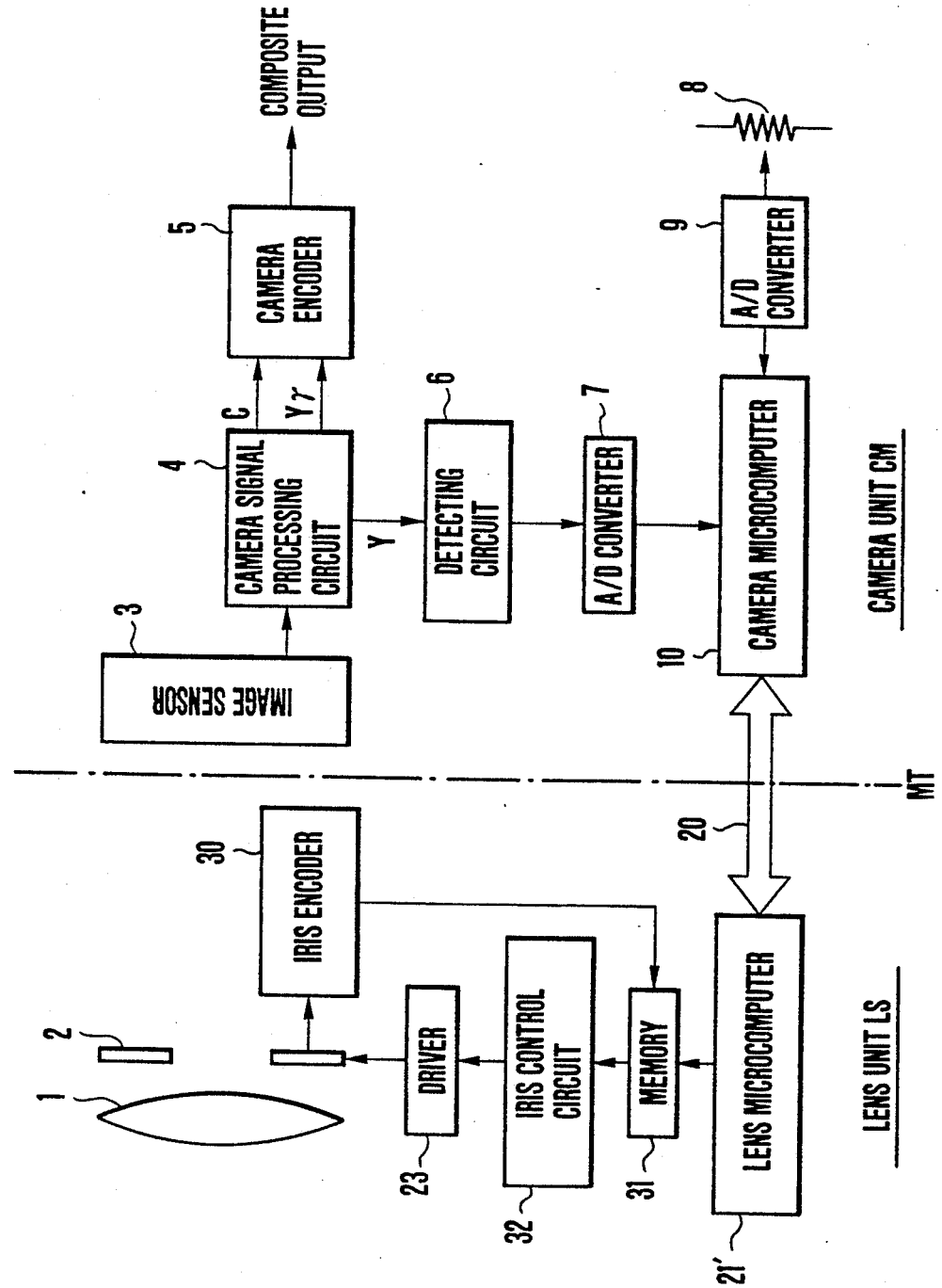

FIG.4

CURRENT APERTURE VALUE (F No.)

| COMMUNICATED VALUE | 1.4 | 2.0 | 2.8 | 4.0 | 5.6 | 8.0 | --- |
|---|---|---|---|---|---|---|---|
| 8 | 1.4 | 1.4 | 1.4 | 2.0 | 2.8 | 4.0 | --- |
| 16 | 1.4 | 1.4 | 2.0 | 2.8 | 4.0 | 5.6 | --- |
| 32 | 1.4 | 2.0 | 2.8 | 4.0 | 5.6 | 8.0 | --- |
| 64 | 2.0 | 2.8 | 4.0 | 5.6 | 8.0 | 11.3 | -- |
| 128 | 2.8 | 4.0 | 5.6 | 8.0 | 11.3 | 16.0 | -- |
| 255 | 4.0 | 5.6 | 8.0 | 11.3 | 16.0 | 22.6 | -- |

IRIS CONTROL DATA (F No.)

FIG.7

| COMMUNICATED VALUE | IRIS CONTROL | |
|---|---|---|
| 8 | TWO STEPS | OPEN |
| 16 | ONE STEP | OPEN |
| 32 | | STOP |
| 64 | ONE STEP | CLOSE |
| 128 | TWO STEPS | CLOSE |
| 255 | THREE STEPS | CLOSE |

IRIS CONTROL DATA

CAMERA-UNIT SIDE

LENS-UNIT SIDE

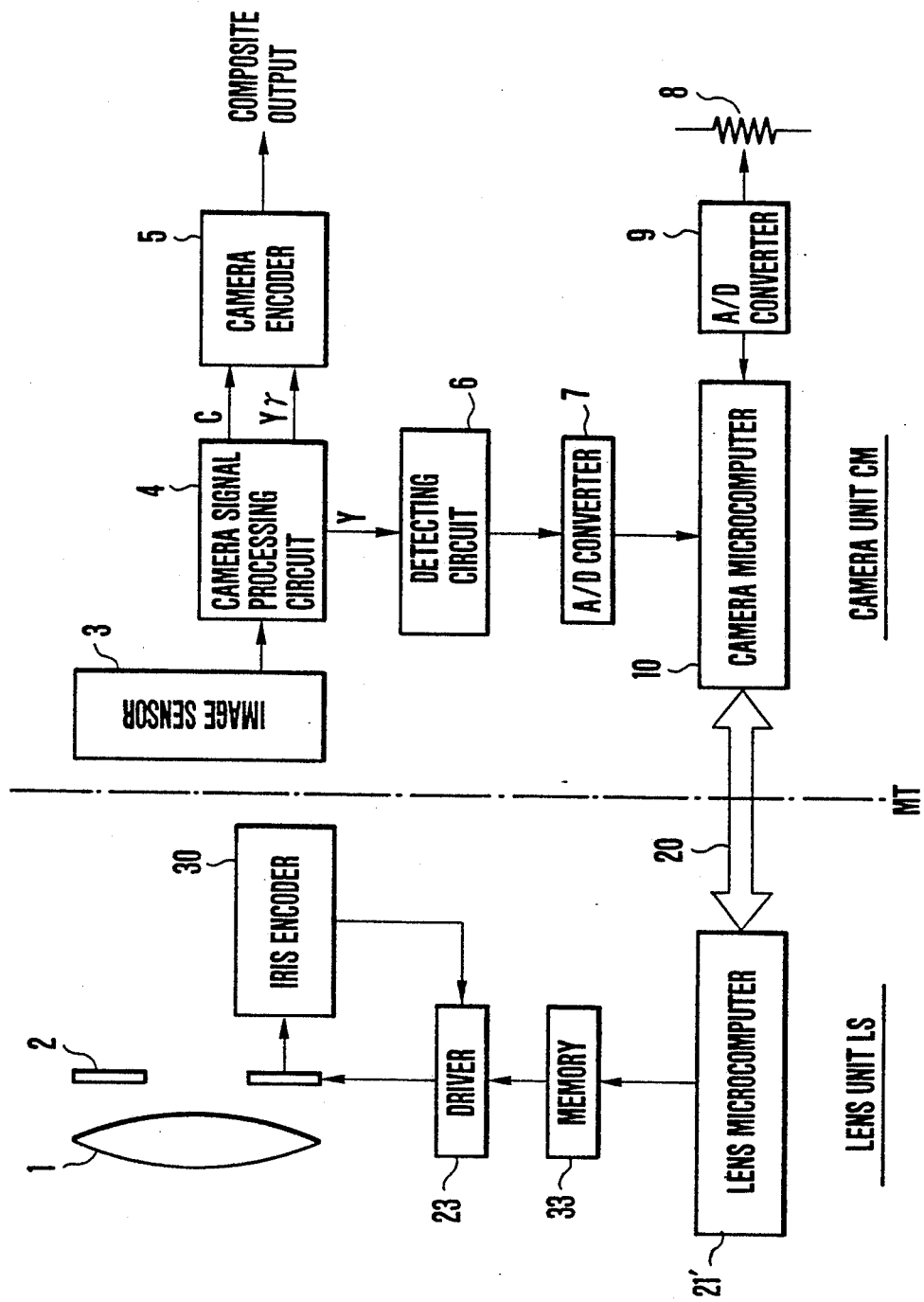

INTERCHANGEABLE LENS SYSTEM WITH ABSOLUTE VALVE EXPOSURE CONTROL

BACKGROUND OF THE INVENTION

1. Field of the Invention

The present invention relates to an interchangeable lens system and, more particularly, to a so-called electronic mount system which permits the data required for various kinds of control to be communicated between a lens unit and a camera unit.

2. Description of the Related Art

With the recent development of video apparatus such as video tape recorders, it has been proposed to provide video cameras, camera-integrated video tape recorders and the like equipped with interchangeable lens systems, which have been popular in the field of conventional silver-salt cameras.

If an interchangeable lens system is applied to such a video tape recorder or the like, it is necessary to reliably control the drive system of a lens unit in accordance with a command sent from a camera unit. For this reason, it is necessary to transmit various kinds of information from the camera unit to the lens unit by means of a normalized and coded control signal so that the interchangeability of lens control information can be fully assured.

If such information transmission is applied to, for example, an exposure control (AE: auto-iris) device, it is possible to implement automatic exposure control of the type which is similar to that realized in a conventional camera-integrated video tape recorder having no interchangeable lens system.

FIG. 1 is a schematic block diagram showing one example of the arrangement of the exposure control system used in this kind of interchangeable lens system. Such an arrangement is disclosed in, for example, U.S. Pat. No. 4,959,728.

In FIG. 1, the right-hand side of the mount part MT shown by a middle chain line corresponds to a camera unit CM, while the left-hand side corresponds to a lens unit LS.

A subject image is formed on the imaging surface of an image sensor 3 of the camera unit CM via an iris 2 by a lens optical system 1. The subject image is photoelectrically converted by the image sensor 3 and is outputted as an image sensing signal. The image sensing signal outputted from the image sensor 3 is supplied to a camera signal processing circuit 4, where it is subjected to predetermined processing such as gamma conversion and a chrominance signal C and a luminance signal Yγ are taken out as video signals. The chrominance signal C and the luminance signal Yγ are passed through a camera encoder 5 of an NTSC type or the like, and are outputted from the camera unit CM in the form of a composite video signal or the like.

A luminance signal Y which is outputted from the camera signal processing circuit 4 is supplied to a detecting circuit 6, where it is subjected to detection. The detecting circuit 6 outputs the result as a control signal for controlling the iris 2 so that correct exposure which matches the state of luminance of a picture can always be obtained.

The control signal outputted from the detecting circuit 6 is converted into digital data by an A/D converter 7, and then fetched into a camera-unit controlling microcomputer (hereinafter referred to as a "camera microcomputer") 10. In the meantime, a reference value which is generated by a reference voltage generator 8 is similarly converted into digital data by the A/D converter 9, and then fetched into the camera microcomputer 10. In the camera microcomputer 10, the aforesaid control signal is normalized by using the reference value.

Arithmetic processing for this normalization is expressed by, for example, the following equation:

$$Di = \frac{(Yc - Yb)}{(Yr - Yb)} \times 32$$

where
- Di: iris data,
- Yc: level of the AE control signal inputted to the camera microcomputer,
- Yr: level of a signal Yc when the luminance signal is at its reference level, and
- Yb: level of the signal Yc when the image sensor is shielded from light.

An exposure control signal normalized through the above-described arithmetic operations is obtained.

Processing in the lens unit LS will be explained below. The exposure control signal is communicated from the camera microcomputer 10 to the lens unit LS over a data communication path 20. The communicated exposure control signal is fetched into a lens-unit controlling microcomputer (hereinafter referred to as a "lens microcomputer") 21, where it is subjected to serial-to-parallel conversion. The parallel output from the lens microcomputer 21 is converted into an analog control signal by a D/A converter 22. Then, the output of the D/A converter 22 is supplied to a driver 23, so that the iris 2 is driven.

FIGS. 2(a) and 2(b) are flowcharts showing the exposure control operation executed in the system of FIG. 1.

As shown in FIG. 2(a), processing on the camera-unit side includes the following steps.

Step #1: The output of the detecting circuit 6 is fetched into the camera microcomputer 10 from the A/D converter 7.

Step #2: A reference level is fetched into the camera microcomputer 10 from the A/D converter 9.

Step #3: The camera microcomputer 10 computes iris data Di on the basis of the above-described equation.

Step #4: The process waits until the input timing of a V sync signal (a video vertical synchronizing signal) which follows after a predetermined number of V sync signals has been inputted.

Step #5: A chip select signal is set.

Step #6: The camera microcomputer 10 effects parallel-to-serial conversion of the iris data and transmits the result from the camera unit CM to the lens unit LS by serial communication.

Step #7: The chip select signal is reset to bring the communication to an end.

Through the above-described operation, the transmission of the iris data from the camera unit CM to the lens unit LS is completed.

Processing by the lens microcomputer 21 on the lens-unit side shown in FIG. 2(b) will now be explained.

Step #8: It is determined whether the chip select signal indicative of the start of communication has been inputted.

Step #9: The lens microcomputer 21 fetches the iris data by effecting serial-to-parallel conversion of the serial communicated data.

Step #10: The received iris data is sent to the D/A converter 22.

Step #11: The iris 2 is driven on the basis of the iris control signal outputted from the D/A converter 22.

Communication of control information between the camera unit and the lens unit is performed in the above-described manner, whereby iris control similar to a conventional one is provided.

As is apparent from the foregoing description, no particular problem will be encountered during the automatic exposure adjustment of the camera-integrated video tape recorder having the aforesaid interchangeable lens system.

It is to be noted, however, that the exposure control of the above-described interchangeable lens system is similar to that of a conventional system using no interchangeable lens system. In other words, the above-described interchangeable lens system is arranged to supply the amount of displacement relative to the current state of the iris and performs relative iris control which allows for no aperture value.

A transient operation occurring when the quantity of light varies will be considered here. According to the above-described iris control, the following steps are repeated:

Detection output varies→Iris driving data is outputted→Communication is performed→Iris is driven→Quantity of light varies→Detection output varies.

During this process, if the loop gain of an exposure control system is high, the iris may be excessively controlled to cause a transient variation in the state of exposure, with the result that an imperfect image may occur immediately before the image stabilizes. Oscillation may also occur under particularly unfavorable conditions.

If the exposure control system is stabilized to such an extent that no overshoot occurs in the control system, the speed of response will lower and relatively slow control will result.

The above-described transient operation of the exposure control system also results from the duration of time required for data communication which is needed in the interchangeable lens system.

Research and development which have been conducted since U.S. Pat. No. 4,959,728 has revealed that there is a room for improvement in the above-described respects.

SUMMARY OF THE INVENTION

It is, therefore, a first object of the present invention to achieve exposure control whose operation is smooth and stable and which has a good response.

A second object of the present invention is to provide an exposure control device suitable for use in an interchangeable-lens video camera.

A third object of the present invention is to provide a video camera which can implement stable and good-response exposure control under which it is possible to rapidly effect a constantly smooth exposure adjustment operation without hunting or overshoot.

To achieve the above-described objects, according to one preferred form of the present invention, there is provided an interchangeable lens system which includes a camera unit and a lens unit detachably attached to the camera unit. The camera unit includes exposure control signal forming means for forming an exposure control signal for control of the state of exposure and a control reference value for the exposure control signal, and transmitting means for transmitting to the lens unit the exposure control signal formed by the exposure control signal forming means. The lens unit includes exposure controlling means for controlling the state of exposure, receiving means for receiving the exposure control signal from the camera unit, information generating means for generating an absolute control amount for the exposure controlling means on the basis of the exposure control signal received by the receiving means, and controlling means for controlling the exposure controlling means in accordance with the absolute control amount.

A fourth object of the present invention is to provide a lens unit provided with an exposure control device suitable for use in an interchangeable-lens video camera.

To achieve the above-described object, according to another preferred form of the present invention, there is provided a lens unit which can be detachably attached to a camera unit and which includes exposure controlling means for controlling the state of exposure, receiving means for receiving an exposure control signal supplied from the camera unit for control of the state of exposure, data converting means for converting the received exposure control signal into absolute driving position information relative to the exposure controlling means, and controlling means for controlling an absolute driving position of the exposure controlling means on the basis of the absolute driving position information outputted from the data converting means.

Another object of the present invention is to provide a lens unit which can always stably and rapidly control an iris in accordance with an absolute aperture value thereof by converting, in a lens unit, a normalized exposure control signal transmitted from a camera unit into an absolute control value such as the absolute aperture value or an absolute drive amount for the iris, and which can drive, even if the speed of response is enhanced, the iris up to a desired aperture value extremely stably and highly accurately without transient excessive overshoot or hunting peculiar to a closed loop, which may occur in a system in which the opening and closing of the iris is controlled not by using its aperture value but by a feedback loop based on a luminance variation only.

Another object of the present invention is to provide a lens unit which, in the art of implementing an interchangeable lens system suitable for use with a video apparatus such as a video camera, makes it possible to smoothen the operation of an iris by converting a normalized signal communicated from a camera unit to the lens unit into an absolute aperture value and controlling the iris in accordance with the absolute aperture value, and also which is extremely advantageous for retaining the interchangeability of different lens units.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 3 is a schematic block diagram showing a first embodiment of an interchangeable lens system according to the present invention;

FIG. 4 is a view showing an example of an iris control data table which is memorized in the memory of the first embodiment of the present invention;

FIG. 6 is a schematic block diagram showing a second embodiment of the interchangeable lens system according to the present invention; and FIG. 7 is a view showing an example of an iris control data table which is memorized in the memory of the second embodiment of the present invention.

DETAILED DESCRIPTION OF THE PREFERRED EMBODIMENTS

Preferred embodiments of an interchangeable lens system according to the present invention will be described below with reference to the accompanying drawings.

FIG. 3 is a schematic block diagram showing a first embodiment of the interchangeable lens system according to the present invention.

Figure 1:
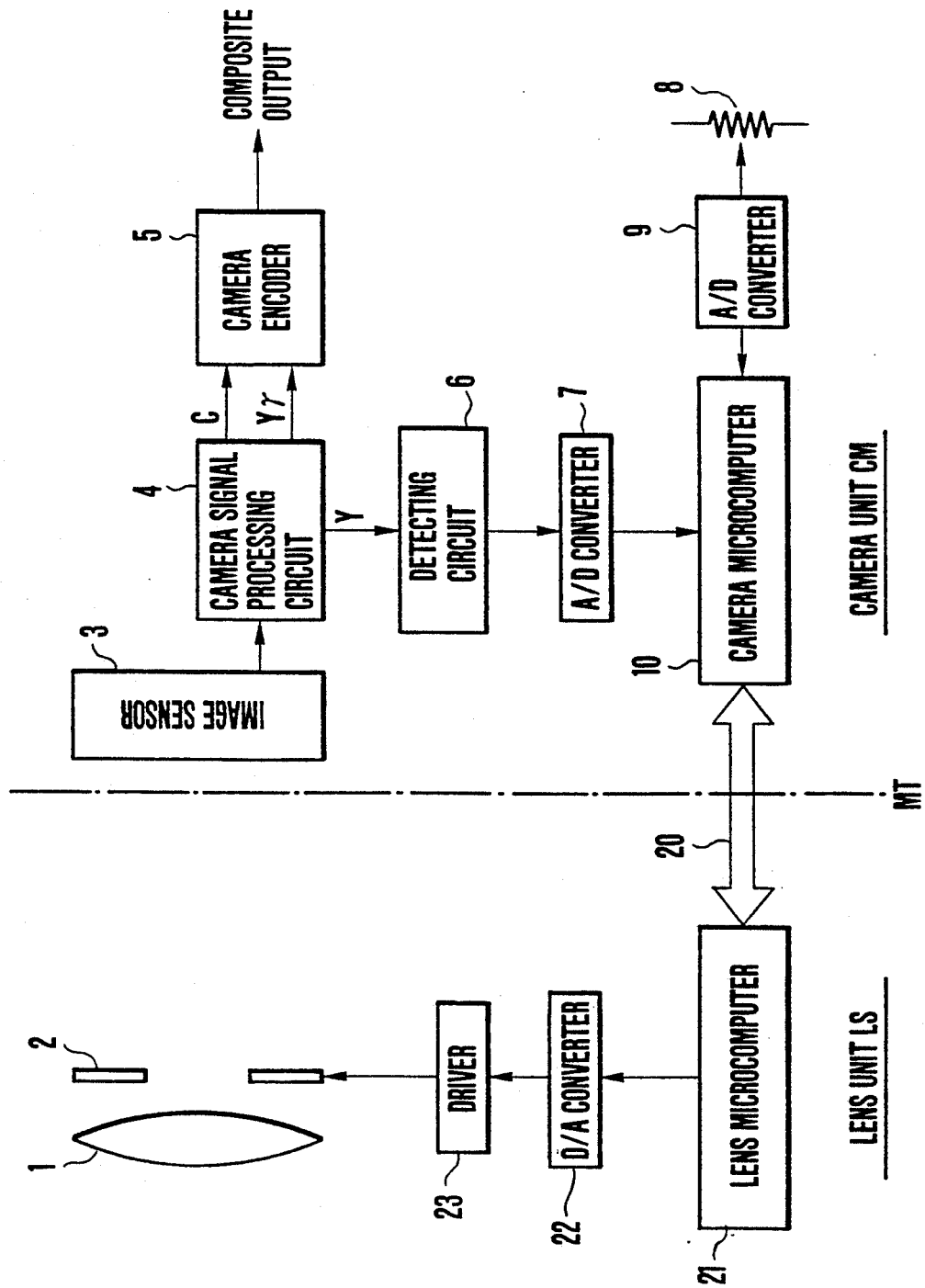
FIG. 1 is a schematic block diagram showing one example of an interchangeable lens system which precedes the invention of the present application.

In FIG. 3, like reference numerals are used to denote elements which are identical to those used in the above-described system example shown in FIG. 1, and a detailed description is omitted.

In FIG. 3, a control flow associated with the processing and communication executed by a camera unit is substantially the same as the control flow of the camera system described in connection with FIG. 2(a), and a detailed description is omitted.

In FIG. 3, the right-hand side of the mount part MT shown by a middle chain line corresponds to a camera unit CM, while the left-hand side corresponds to a lens unit LS.

In the camera unit CM, a luminance signal outputted from a camera signal processing circuit 4 is formed into an exposure control signal through a detecting circuit 6 and an A/D converter 7. The exposure control signal is supplied to a camera microcomputer 10, where it is subjected to predetermined signal processing and then parallel-to-serial conversion. The obtained signal is transmitted as a control signal to the lens unit LS over a data communication path 20.

The data communication path 20 is coupled to a lens microcomputer 21', and all communicated data are received by the lens microcomputer 21'.

The exposure control signal communicated in the above-described manner is converted into a value which is memorized in a memory 31 at the address determined by the value of the exposure control signal and the current output value of an iris encoder 30. The obtained value is inputted to an iris control circuit 32.

The iris control circuit 32 compares an aperture value supplied from the iris encoder 30 with the value outputted from the memory 31, and controls an iris 2 by means of a driver 23 so that these values are made equal to each other.

FIG. 4 shows an example of an iris control data table which is memorized in the memory 31.

Referring to FIG. 4, in a case where F2.8 is the current aperture value of the above-described system, if the coded exposure control signal "64" (overexposure by 1EV) is communicated from the camera unit CM to the lens unit LS, F4.0, which is contained in the table of FIG. 4 at the intersection of a row corresponding to the value "64" and a column corresponding to the current aperture value F2.8 detected by the iris encoder 30, is outputted as iris control data.

Accordingly, the iris control circuit 32 drives the iris 2 by means of the driver 23 to set the aperture value to F4.0.

Figure 2A:
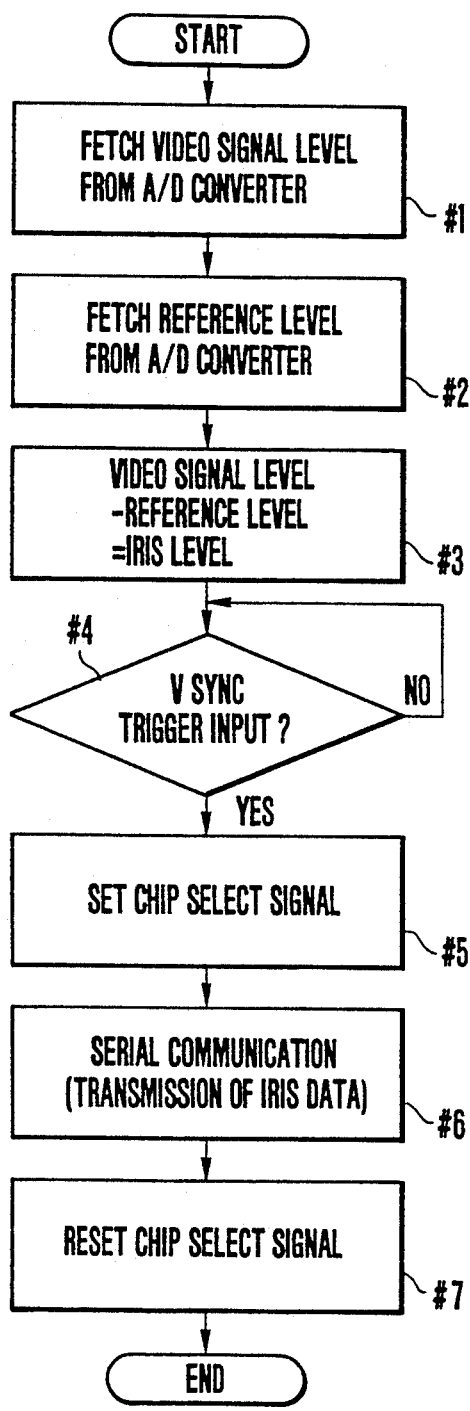
FIGS. 2(a) and 2(b) are flowcharts for explaining the control operation of the exposure control device used in the interchangeable lens system shown in FIG. 1.
Figure 2B:
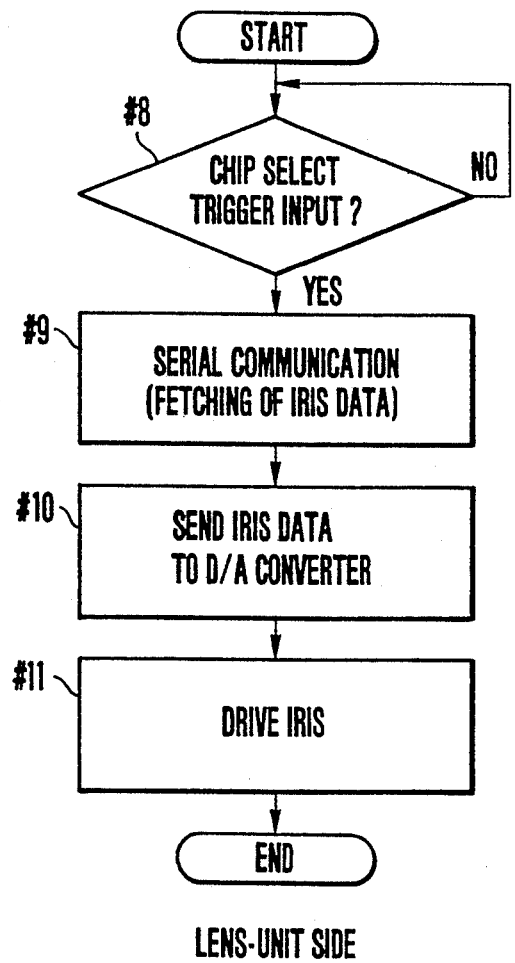

As is apparent from the foregoing description, in accordance with the first embodiment of the present invention, unlike the arrangement of FIGS. 1, 2(a) and 2(b) which detects no aperture value and provides iris control by forming a feedback loop to make a luminance signal level of the camera unit equal to a reference value, the iris 2 is controlled in accordance with an absolute aperture value such as F2.8, F4.0, ... Accordingly, a problem such as excessive overshoot or hunting is prevented from occurring from the time the iris is activated until it reaches and stabilizes at a desired value, whereby stable and rapid iris control can be provided.

Figure 5A:
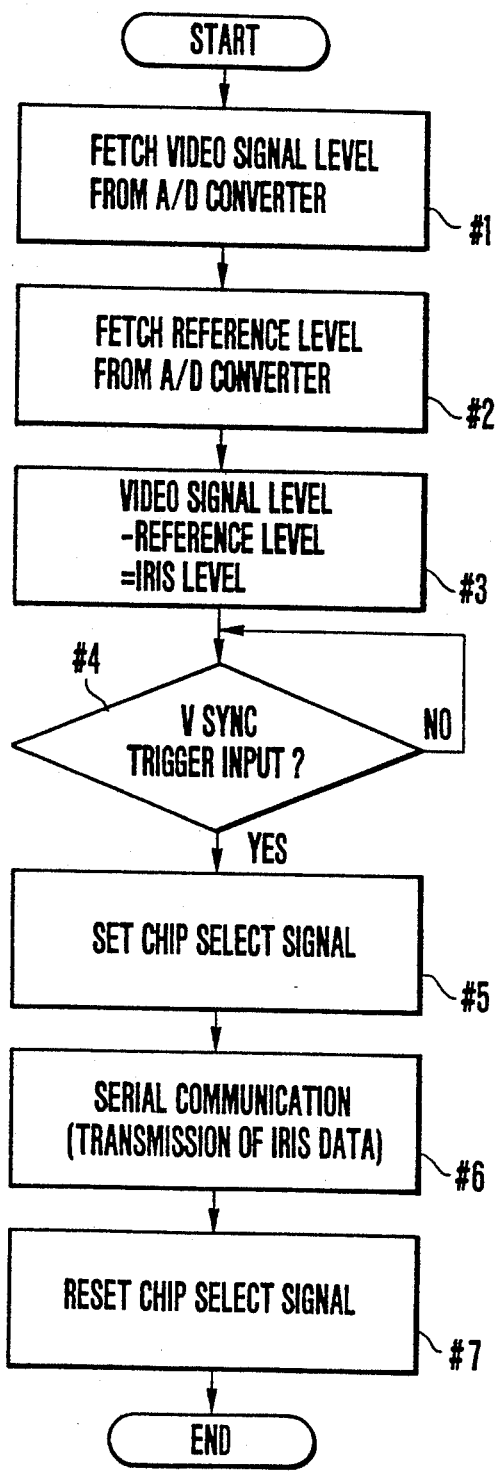
FIGS. 5(a) and 5(b) are flowcharts for explaining the control operation of the first embodiment of the present invention.
Figure 5B:
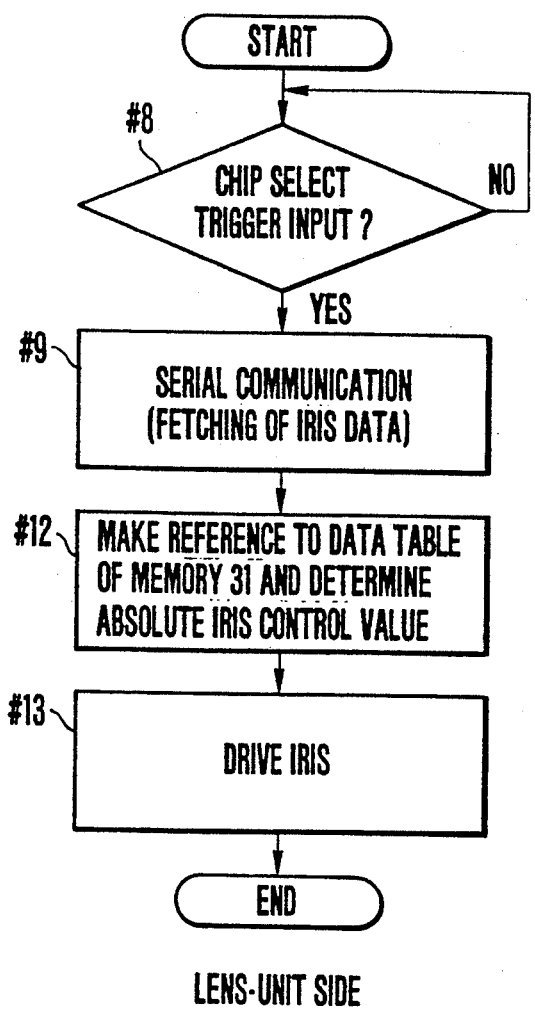

FIGS. 5(a) and 5(b) are flowcharts showing the control operation of the above-described first embodiment of the present invention.

In the flowcharts of FIGS. 5(a) and 5(b), like reference numerals are used to denote steps for executing control operations substantially identical to those of the steps shown in FIGS. 2(a) and 2(b), and a detailed description is omitted.

In FIGS. 5(a) and 5(b), the shown control flows associated with the processing and communication executed on the camera-unit side are similar to the control flows of the camera system shown in FIGS. 2(a) and 2(b). It is to be noted, however, that the flowcharts of FIGS. 5(b) and 2(b) mainly differ from each other in that Steps #12 and #13 are substituted for Steps #10 and #11 in the flowchart on the lens-unit side of FIG. 5(b).

More specifically, the first embodiment differs in construction from the previously-described example in that the lens unit LS of this embodiment is provided with a control system for converting an exposure control signal transmitted from the above-described camera unit into an absolute iris control value and driving the iris 2 in accordance with a corresponding absolute aperture value.

In FIG. 5(a), Steps #1 to #7 for controlling the communication of data from the camera-unit side are similar to those shown in FIG. 2(a).

On the camera-unit side, the following processing is executed.

Step #1: The output of the detecting circuit 6 is fetched into the camera microcomputer 10 from the A/D converter 7.

Step #2: A reference level is fetched into the camera microcomputer 10 from the A/D converter 9.

Step #3: The camera microcomputer 10 computes iris data Di on the basis of the previously-described equation.

Step #4: The process waits until the input timing of a V sync signal (a video vertical synchronizing signal) which follows after a predetermined number of V sync signals have been inputted.

Step #5: A chip select signal is set.

Step #6: The camera microcomputer 10 effects parallel-to-serial conversion of the iris data and transmits the result from the camera unit CM to the lens unit LS by serial communication.

Step #7: The chip select signal is reset to bring the communication to an end.

Through the above-described operation, the transmission of the iris data, i.e., an exposure control signal, from the camera-unit side to the lens-unit side is completed.

On the lens-unit side, the following processing is executed.

Step #8: It is determined whether the chip select signal indicative of the start of communication has been inputted.

Step #9: The lens microcomputer 21' fetches the iris data by effecting serial-to-parallel conversion of the serial communicated data.

Step #12: The iris data fetched into the lens microcomputer 21' and the aperture value detected by the iris encoder 30 are compared with the iris control data of the table shown in FIG. 4, and an absolute iris control value which serves as a desired value is obtained.

Step #13: The absolute aperture value selected in the memory 31 is supplied to the iris control circuit 32, where the aperture value detected by the iris encoder 30 is compared with the value outputted from the memory 31 to control the iris 2 so that both values are made equal.

As is apparent from the foregoing description, in accordance with the above-described first embodiment, an exposure control signal which is based on the amount of variation of the state of exposure is detected by the camera unit and the exposure control signal is transmitted therefrom to the lens unit. The received exposure control signal is compared with the current aperture value detected by the iris encoder to obtain an aperture value which serves as a desired value, in the form of an absolute aperture value. The iris is controlled in accordance with the absolute aperture value. Accordingly, it is possible to always stably control the iris in accordance with an aperture value without any problem such as a transient system hunting which may be experienced in feedback-loop control or a delay due to closed-loop control.

A second embodiment of the interchangeable lens system according to the present invention will be explained below with reference to FIG. 6.

In contrast to the above-described first embodiment which is arranged to control an iris in accordance with an absolute aperture value, the second embodiment is arranged to obtain an absolute control amount for an iris relative to a desired value from an exposure control signal transmitted from a camera unit and then to control the iris in accordance with the absolute control amount.

In FIG. 6, like reference numerals are used to denote elements which are substantially identical to those used in the arrangement of either the previously-described example shown in FIG. 1 or the first embodiment shown in FIG. 3, and a detailed description is omitted. The control executed by a camera unit is substantially the same as the control of the aforesaid system, and a detailed description as to the camera unit is omitted.

An exposure control signal which is generated in the camera unit CM is transmitted to the lens unit LS through the camera microcomputer 10 and the data communication path 20.

The data communication path 20 is coupled to the lens microcomputer 21', and all communicated data are received by the lens microcomputer 21'.

The exposure control signal communicated in the above-described manner is converted into the value of an absolute control amount which is memorized in a memory 33 at the address determined by the value of the exposure control signal. The obtained value is inputted to the driver 23.

The driver 23 drives the iris 2 by a specified amount in response to the input signal from the memory 33.

FIG. 7 shows an example of the iris control data table which is memorized in the memory 33.

Referring to FIG. 7, in the above-described system, if a coded exposure control signal, for example, "64" (overexposure by 1EV), is communicated from the camera unit CM to the lens unit LS, data indicating that the iris 2 should be stopped down in a predetermined unit of drive amount (by one step) is supplied to the driver 23, whereby the iris 2 is driven in the direction in which it is stopped down by "one step". The aperture value of the iris 2 is detected by the iris encoder 30 and supplied to the driver 23, whereby the aperture value is accurately controlled.

If another coded exposure control signal, for example, "8", is communicated from the camera unit CM to the lens unit LS, data indicating that the iris 2 should be opened by two steps in the aforesaid predetermined unit of drive amount is supplied to the driver 23, whereby the iris 2 is likewise driven in a specified direction.

As is apparent from the foregoing description, according to the second embodiment of the present invention, the variation of a luminance level transmitted from the camera unit is converted into an absolute drive amount relative to the current aperture value and the iris is controlled in accordance with the absolute drive amount. Accordingly, it is possible to substantially control the iris in accordance with an absolute aperture value.

According to each of the above-described embodiments, the exposure control signal transmitted from the camera unit is converted into absolute information on the basis of a data table incorporated in the lens unit. Accordingly, it is possible to use a single camera unit in combination with various interchangeable lens units. In addition, since it is only necessary that each individual lens unit be provided with a data table for optimum iris control, an interchangeable lens system can be constructed extremely favorably.

As described above, the interchangeable lens system according to the present invention is arranged in such a manner that a normalized exposure control signal transmitted from a camera unit is converted, in a lens unit, into an absolute control value such as an absolute aperture value or absolute drive amount for an iris. Accordingly, it is possible to always stably and rapidly control the iris in accordance with the absolute aperture value. It is also possible to prevent transient excessive overshoot or hunting peculiar to a closed loop, which may occur in a system in which the opening and closing of an iris is controlled not by using its aperture value but by a feedback loop based on a luminance variation only. Accordingly, it is possible to drive the iris up to a desired aperture value extremely stably and highly accurately even if the speed of response is enhanced.

As is apparent from the foregoing, in the art of implementing an interchangeable lens system suitable for use with a video apparatus such as a video camera, the present invention makes it possible to smoothen the operation of an iris by converting a normalized signal communicated from a camera unit to a lens unit into an absolute value and controlling the iris in accordance with the absolute value. The present invention is also extremely advantageous for retaining the interchangeability of different lens units.

What is claimed is:

1. An interchangeable lens system including a camera unit and a lens unit detachably attached to said camera unit, comprising:
   (A) exposure control signal forming means disposed in said camera unit for forming an exposure control signal for controlling a state of exposure;
   (B) transmitting means disposed in said camera unit for transmitting to said lens unit the exposure control signal formed by said exposure control signal forming means;
   (C) exposure controlling means disposed in said lens unit for controlling the state of exposure;
   (D) receiving means disposed in said lens unit for receiving the exposure control signal from said camera unit;
   (E) information generating means for generating an absolute control amount for said exposure controlling means on the basis of the exposure control signal received by said receiving means; and
   (F) controlling means for controlling an absolute driving position of said exposure controlling means in accordance with the absolute control amount.

2. An interchangeable lens system according to claim 1, wherein the exposure control signal transmitted from said camera unit to said lens unit is represented by the ratio of light quantity (EV value).

3. An interchangeable lens system according to claim 1, wherein said exposure controlling means controlled in accordance with the absolute control amount is an optical iris mechanism disposed in said lens unit.

4. An interchangeable lens system including a camera unit and a lens unit detachably attached to said camera unit, comprising:
   (A) exposure control signal forming means disposed in said camera unit for forming an exposure control signal for controlling a state of exposure;
   (B) transmitting means disposed in said camera unit for transmitting to said lens unit the exposure control signal formed by said exposure control signal forming means;
   (C) exposure controlling means disposed in said lens unit for controlling the state of exposure;
   (D) receiving means disposed in said lens unit for receiving the exposure control signal from said camera unit;
   (E) information generating means for generating an absolute control amount for said exposure controlling means on the basis of the exposure control signal received by said receiving means, said information generating means including a memory in which are memorized aperture values corresponding to said exposure control signal transmitted from said camera unit, said information generating means selectively outputting an appropriate aperture value from among the aperture values memorized in said memory; and
   (F) controlling means for controlling said exposure controlling means in accordance with said output aperture value.

5. A lens unit which can be detachably attached to a camera unit, comprising:
   (A) exposure controlling means for controlling a state of exposure;
   (B) receiving means for receiving an exposure control signal supplied from said camera unit for control of the state of exposure;
   (C) absolute driving position information generating means responsive to the received exposure control signal for generating absolute driving position information for said exposure controlling means; and
   (D) controlling means for controlling an absolute driving position of said exposure controlling means on the basis of the absolute driving position information outputted from said absolute driving position information generating means.

6. A lens unit according to claim 5, wherein said absolute driving position information generating means is arranged to output the absolute driving position information of said exposure controlling means on the basis of the exposure control signal and position information indicative of the position of said exposure controlling means.

7. A lens unit according to claim 6, wherein said data converting absolute driving position information generating means is provided with a control data table memorized in a memory.

8. A lens unit comprising:
   (A) an actuator for varying a photographing state of the lens unit;
   (B) receiving means for receiving a control signal transmitted from a camera unit at predetermined periods;
   (C) computing means for computing an absolute driving position of said actuator on the basis of the control signal received by said receiving means and outputting an information of said absolute driving position, said computing means including a memory in which a relation between a control amount indicated by said control signal and the absolute driving position of said actuator is memorized; and
   (D) driving means for driving said actuator in accordance with an output of said computing means.

9. A lens unit according to claim 8, wherein said receiving means is arranged to effect a communication with said camera unit in synchronism with a V-sync signal.

10. A lens unit according to claim 8, wherein said actuator is an iris driving means.

11. A lens unit according to claim 10, wherein the control signal transmitted from said camera unit is an EV value signal.

12. A lens unit according to claim 11, wherein said absolute driving position indicates a diaphragm value.

13. An interchangeable lens unit, comprising:
   (A) an actuator for varying an opening amount of a diaphragm for controlling an incident light amount;
   (B) a diaphragm encoder for detecting an opening amount of said diaphragm;
   (C) receiving means for receiving a control signal relating to a luminance level transmitted from a camera unit, to which said lens unit is attachable, in synchronism with transmitting periods at the side of said camera unit;
   (D) computing means for computing an absolute opening amount of said diaphragm on the basis of the control signal received by said receiving means, said receiving means including a memory in which a relation between a control level indicated by said control signal and an absolute driving position of said actuator is memorized; and (E) driving means for driving said actuator so that the absolute opening amount outputted from said computing means becomes equal to the opening amount detected by said diaphragm encoder.

14. An interchangeable lens unit according to claim 13, wherein the control signal transmitter from said camera unit is an EV value signal.

15. An interchangeable lens unit according to claim 13, wherein an information memorized in said memory means is a diaphragm control information specific to the lens unit.

* * * * *